May 19, 1931.    H. ROSENBERG    1,806,503
APPARATUS FOR TREATING METAL WORK
Filed July 23, 1929    2 Sheets-Sheet 2

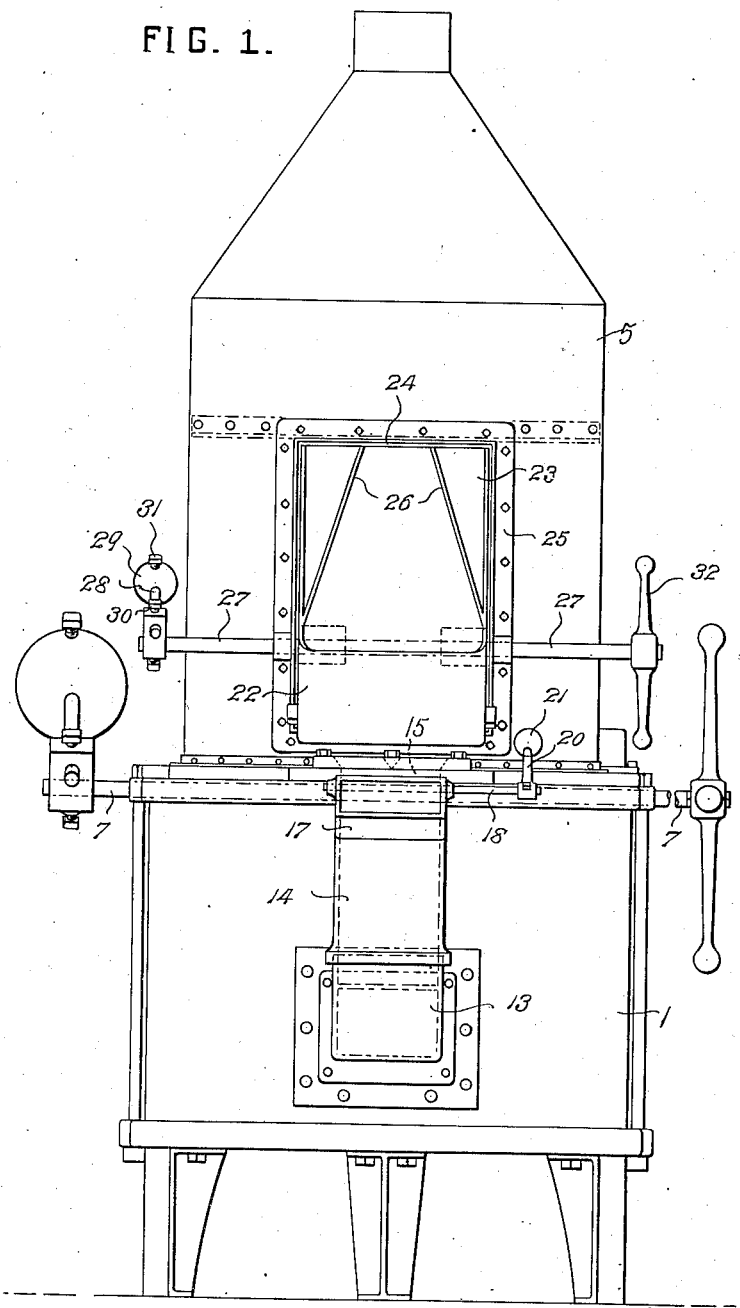

Inventor
HEYMAN ROSENBERG
By Edgar M. Kitchin,
his Attorney.

Patented May 19, 1931

1,806,503

UNITED STATES PATENT OFFICE

HEYMAN ROSENBERG, OF NEW YORK, N. Y.

APPARATUS FOR TREATING METAL WORK

Application filed July 23, 1929. Serial No. 380,350.

This invention relates to improvements in apparatus for case-hardening, and has as its essential object the advancing of the improvements incorporated as the subject matter of my copending application filed June 20th, 1929, patented December 30, 1930, No. 1,786,508.

A more detailed object is the conservation of values and increase in efficiency following the utilization of waste heat from the cyanide or other salts furnace for preheating the work to be hardened.

A further object is the delivery of preheated work to the molten salts without affording opportunity for cooling or chilling of the work.

A still further object is the delivery of work to the molten salts with opportunity for escape of fumes reduced substantially to a negative.

A still further object is reduction of labor and increase of ease and facility with which work may be handled as well as increase in speed.

With these and further objects in view as will in part hereinafter become apparent and in part be stated, the invention comprises certain constructions, combinations, and arrangements of parts as subsequently specified and claimed.

In the accompanying drawings,—

Figure 1 is a front elevation of an apparatus embodying the features of the present invention.

Figure 3:
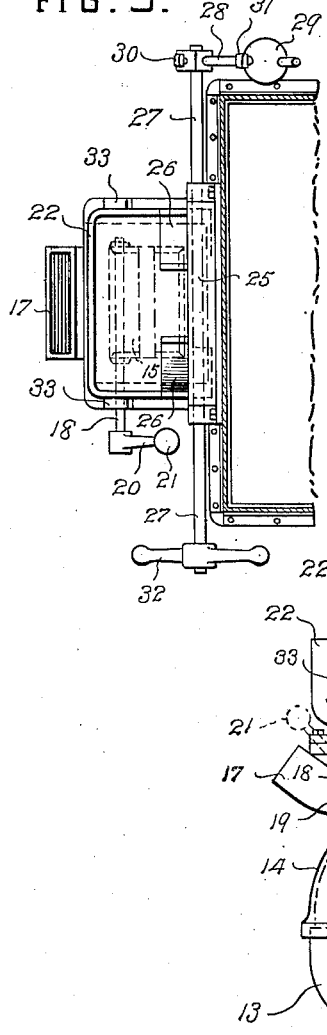
Figure 3 is a top plan view of the work preheating attachments, parts of the furnace being broken away for the saving of space.

In my above-identified co-pending application, there is disclosed a plant for hardening of work by the cyaniding or other salts process involving apparatus for facilitating handling of work after it has been placed in the container to be submerged in the molten salts, provision being made for removal of work therefrom for quenching the work and for removal of the work from the quench without exhaustion of fumes into the atmosphere about the plant.

The present invention relates to attachments for such a plant to facilitate the preheating of work or carbonizing thereof at a point so juxtaposed with respect to the salts vat as to utilize waste heat from the furnace for said vat and to enable ready discharge of preheated work without chilling or reduction of the temperature of such work from the time of leaving the point of heating to the time of entering the molten salts.

Repetition of structural details and operations fully set forth in my above-identified co-pending application will be as largely avoided as practicable while rendering clear the present improvements.

Referring to the drawings by numerals, 1 indicates the furnace for the cyanide or other salts vat 2. The furnace 1 may be heated with fuel of any desired character, such, for example, as gas supplied through pipe 3 and burners 4. Mounted on the furnace 1 is a housing or hood 5 having a vestibule housing 6 extending to enclose the area above the quenching vat, not illustrated, but shown in detail in my said co-pending application. A rock shaft 7 is journaled in a frame of furnace 1 and carries a crank arm 8 to which is fixed and from which suspends the work container 9, which is a reticulated metal basket adapted to contain small particles of work, such as screws and nails, while admitting free entry an drainage of molten salts. The free end of the arm 8 is adapted to swing through an arc indicated by dot and dash line 10 in Figure 2 to and from a position over the quenching vat, not illustrated, after the manner set forth in detail in my said copending application.

The hood 5 is preferably provided with a door 11 having a heat-resisting, transparent plate 12 which may be pyrex, mica, or other acceptable heat-resisting substance. The door 11 is maintained closed under all normal conditions during operation, but affords access to the interior when the furnace is shut down and repairs are required, or other occasion for interior work arises. All of the structural features thus far described are disclosed and covered in my said co-pending application, and are here referred to to render clear their relation to the novel parts and their proper combination therewith.

Furnaces, such as furnace 1, are customarily provided with a flue or exhaust pipe 13 through which under ordinary working conditions flames and other hot products of combustion constantly exhaust. The flue 13 frequently exhausts into the atmosphere as a negligible factor, or, in some instances, is connected with a flue leading above the roof of the building in which the plant is located. Thus, whatever heat is exhausted through flue 13 is ordinarily wasted. The present invention includes apparatus for utilizing such exhaust heat by providing a special tube or flue 14 fitting upon and receiving the exhaust from flue 13. The upper end of flue 14 communicates through an opening 15 in the cover plate 16 of furnace 1. The flue 14 is also provided with a branch exhaust pipe 17 leading generally laterally from flue 14 at or near the upper end thereof. A shaft 18 is journaled in the upper end portion of flue 14 at the place of jointure of the upper portion of branch 17, and a flat-plate gate or damper 19 is fixed to and carried by shaft 18, so that, when the shaft is oscillated, the plate may be moved from a pendent position, seen in full lines in Figure 2, where it closes the branch 17, to a horizontal position seen in dotted lines in Figure 2 where it closes opening 15. Shaft 18 is preferably provided with an appropriate operating handle 20 having a weight 21 at its outer extremity to counterbalance and retain the damper 19 in either of its positions, the handle 20 being fixed to shaft 18 at such an angle as to pass the vertical position in moving to either of the two positions of the damper 19.

Arranged above the furnace plate 16 in line with opening 15 is a metallic container or basket 22 adapted to contain work to receive the heat rising through the opening 15. The basket or container 22 is carried by and preferably formed integral with a vertically upstanding plate 23 which is shown as rectangular but which may be otherwise shaped as desired. The rectangular shape tends toward convenience of construction. The hood 5 is formed with a doorway 24 surrounded by an angle bar 25 fixed to the hood 5, and the plate 23 is proportioned to snugly fit within and readily pass through the doorway 24. Thus, when the plate 23 is in its normal or upright position, it serves to close the doorway 24 and thus keep the hood 5 sealed. The plate 23 is preferably provided with upwardly converging, laterally outstanding flanges 26, 26, leading from the upper edge of basket 22 substantially to the upper terminus of plate 23. The convergence of flanges 26 serves to cause said flanges to function as a guiding funnel during some of the operations to be described. A shaft 27 is journaled in the frame 25 and fixed to the inner face of plate 23, so that, when the shaft 27 is oscillated, the plate will be swung with and about the shaft as an axis. To one end portion of shaft 27 is fixed a laterally outstanding arm 28 carrying a counterbalancing weight 29. Arm 28 is adjustably secured by set screw 30 to shaft 27, and weight 29 is adjustably secured by set screw 31 to shaft 28. Weight 29 is located to counterbalance the weight of the outstanding portions of basket 22 and of the work in the basket so as to normally maintain the parts balanced with the plate 23 in an upright position. Counterbalancing weight 29 also serves to reduce the effort required to swing basket 22 when loaded. An operating handle 32 is fixed to the shaft 27 at the opposite end portion from the location of weight 29, handle 32 being preferably located at what is usually considered the front of the furnace, that is, the side having the door 11, so as to be most readily accessible to the operator.

Figure 2:
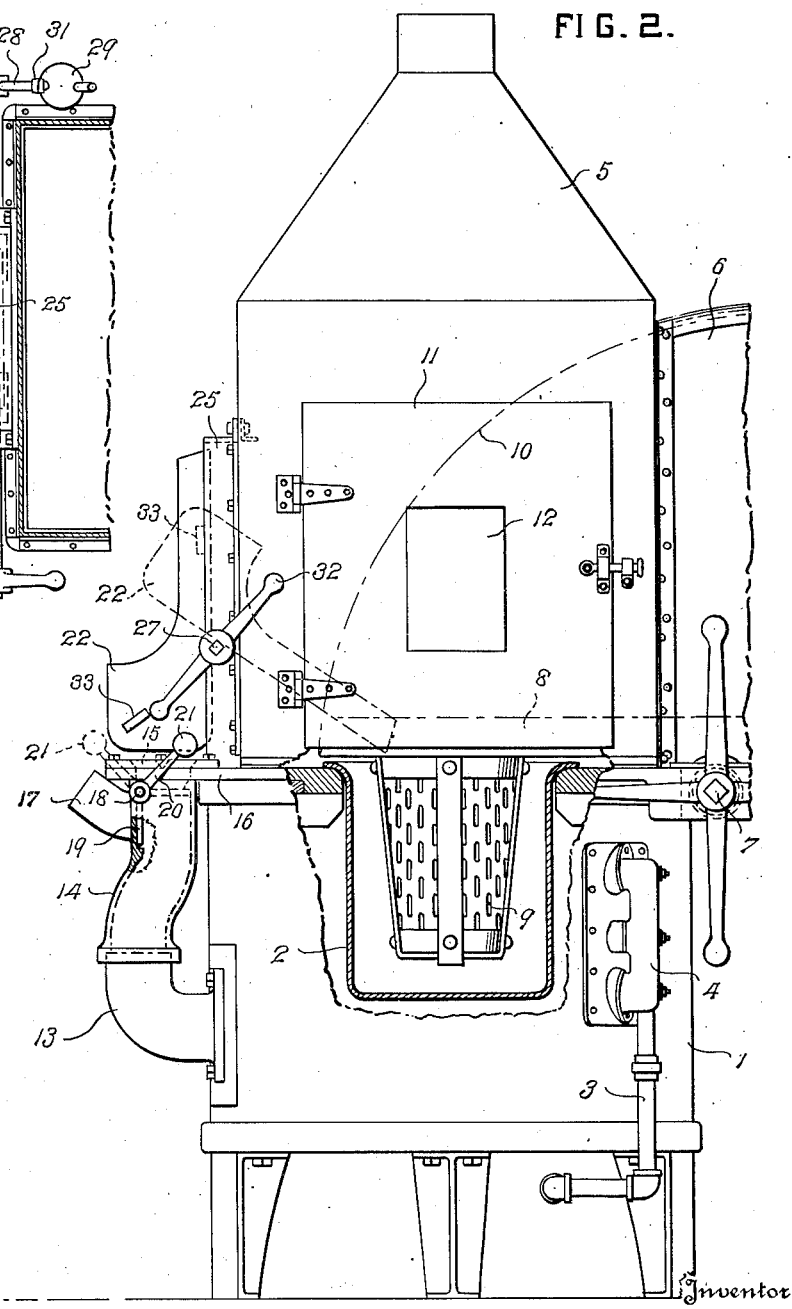
Figure 2 is a side elevation of the same, parts being broken away and parts seen in section, and other parts being broken away for the saving of space.

It is to be observed that the plate 23 is proportioned in length, and the shaft 27 properly located to cause the upper end of the plate to lie immediately above the receptacle 9 near one edge portion thereof when the plate 23 is swung to its innermost position, as shown in dotted lines in Figure 2. An appropriate stop lug 33 is carried by basket 22 and may be cast integral therewith, or otherwise fixed to the basket, and is located to contact with the outstanding flange of angle frame 25, as clearly seen in dotted lines in Figure 2 when the plate 23 is swung to its innermost position. Lug or detent 33 thus stops inward movement in time to prevent actual contact of plate 23 with container 9.

The operation should be fairly obvious, and may be briefly stated as follows: The furnace being in operation, the operator deposits a charge of work in basket 22 and swings the lever 20 to the full line position of Figure 2 if it is not already in that position. The parts are left in this condition, so far as basket 22 and its associated parts are concerned, but if the plant has been previously in operation, the treatment of the work in container 9 will continue and the batch of work will be discharged into the quench after the manner fully set forth in my above-identified copending application, and container 9 swung back into the vat 2. By this time the preheating operation of the work in the basket 22 will have sufficiently progressed and the operator will swing the handles or lever 32 for rocking shaft 27 to swing plate 23 from the upright position to the dotted line position of Figure 2. As the parts reach this position, the charge of work in basket 22 will slide down the plate 23, being concentrated by the guiding flanges 26, and discharge from the now lowered end of plate 23 into the container 9, and as soon as the discharge occurs, the operator will reverse the movement of shaft 27 and thereby restore the basket 22 to its former position, whereupon another charge of work may be introduced. It is possible that some of the operations in the case-hardening process may delay the emptying of the container 9 by the time the treatment of the work in basket 22 has been completed, and when that occurs, over-heating is prevented by swinging lever 20 to the dotted line position of Figure 2, and thereby exhausting the heat from flue 13 through branch 17. The closing and opening of the branch 17 will be a matter for the discretion of the operator as required, according to the progress of the treatment of the work in hand.

It is understood, of course, that the container 9 is never left in the vat 2 when the furnace is shut down, and is, therefore, never present in the vat when the salts are solidified, the container 9 being lowered into the vat at any beginning of operations only after the salts in the vat have acquired a molten state. As the container 9 is not in position to receive a supply of work from basket 22, except when container 9 is in vat 2, no discharge of work from basket 22 occurs except when the furnace parts are conditioned for progressing with the hardening operation.

It is, of course, well known to those skilled in the art of hardening metal work that the common practice is to preheat the work in a cylinder or like container subjected to the heat of an appropriate independent furnace, and when the requisite temperature has been attained, it is then common practice to convey the work and deliver it to the work container in the salts vat, or to such container before introduction into the vat, but with such practice there is the delay incident to such conveyance and the opportunity for drop in temperature of the work, which proportionately reduces the temperature of the molten salts and requires additional fuel and time for bringing the salts back to the required temperature. All this is avoided by the present invention which also avoids undue exposure of the work to air in the heated condition.

What is claimed is:—

1. In apparatus for molten salts hardening of metal work, the combination, with a furnace and a container for salt located to be heated thereby, of a movably mounted container for work located in the path of discharge of heated products from the same furnace, the container being adapted to be moved from the heating position to a discharging position for directing the work from the container into the salt.

2. In apparatus for molten salts hardening of metal work, the combination, with a furnace and a container for salt located to be heated thereby, of a pivotally mounted container for work located to be heated by the same furnace, and means for swinging the container from the heating position to a discharging position for directing the work from the container into the salt while maintaining the work continuously under the influence of the heat of the furnace.

3. In apparatus for molten salts hardening of metal work, the combination, with a furnace and a container for salt located to be heated thereby, of a container for work located adjacent the salt container in position to be heated by said furnace, and a pivotal mounting for said work container located to enable tilting of the work container to a position discharging into the salt container.

4. In apparatus for molten salts hardening of metal work, the combination, with a furnace and a container for salt located to be heated thereby, of a container for work located adjacent the salt container in position to be heated by said furnace, a pivotal mounting for said work container located to enable tilting of the work container to a position discharging into the salt container, and a chute extending from said work container for providing a path for the work from the work container to the salt container when the work container is tilted to the discharging position.

5. In apparatus for molten salts hardening of metal work, the combination, with a furnace and a container for salt located to be heated thereby, of a container for work located adjacent the salt container in position to be heated by said furnace, a pivotal mounting for said work container located to enable tilting of the work container to a position discharging into the salt container, and a hood for the salt container for confining the fumes thereof, the work container being pivoted at the exterior of the hood, and the hood being formed with an opening for enabling the discharge of work into the salt container.

6. In apparatus for molten salts hardening of metal work, the combination, with a furnace and a container for salt located to be heated thereby, of a container for work located adjacent the salt container in position to be heated by said furnace, a pivotal mounting for said work container located to enable tilting of the work container to a position discharging into the salt container, a hood for the salt container for confining the fumes thereof, the work container being pivoted at the exterior of the hood, and the hood being formed with an opening for enabling the discharge of work into the salt container, and means carried by the work container for closing the opening in the hood when the work container is not in a discharging position.

7. In apparatus for molten salts hardening of metal work, the combination, with a furnace and a container for salt located to be heated thereby, of a container for work located adjacent the salt container in position to be heated by said furnace, a pivotal mounting for said work container located to enable tilting of the work container to a position discharging into the salt container, a hood for the salt container for confining the fumes thereof, the work container being pivoted at the exterior of the hood, and the hood being formed with an opening for enabling the discharge of work into the salt container, and means carried by the work container for closing the opening in the hood when the work container is not in a discharging position, the said closing means being located and proportioned to provide a path for discharging work from the work container to the salt container.

In testimony whereof I affix my signature.

HEYMAN ROSENBERG.